United States Patent
Pinkston

[11] Patent Number: 5,871,328
[45] Date of Patent: Feb. 16, 1999

[54] WRECKER TRUCK WITH SLIDING DECK

[76] Inventor: Donald L. Pinkston, 12295 S. Spruce La., Perry, Mich. 48872

[21] Appl. No.: 909,836

[22] Filed: Aug. 12, 1997

[51] Int. Cl.[6] .......................................................... B60P 1/32
[52] U.S. Cl. ............................ 414/477; 298/14; 414/522; 414/812
[58] Field of Search ................................... 414/477–480, 414/522, 812, 494; 298/12, 14–16

[56] References Cited

U.S. PATENT DOCUMENTS

| | | | |
|---|---|---|---|
| 2,576,385 | 11/1951 | Bigsby | 414/522 X |
| 2,753,064 | 7/1956 | Lesser | 414/475 |
| 2,932,418 | 4/1960 | Ripley | 414/478 |
| 2,997,343 | 8/1961 | MacKinney et al. | 298/14 X |
| 3,450,282 | 6/1969 | Ezolt | 414/477 |
| 3,454,175 | 7/1969 | Kellaway | 414/478 |
| 3,485,400 | 12/1969 | Pewthers | 414/477 |
| 4,239,275 | 12/1980 | Horneys et al. | 414/478 |
| 4,353,597 | 10/1982 | Shoup | 298/12 |
| 4,645,405 | 2/1987 | Cambiano | 414/480 X |
| 4,756,658 | 7/1988 | Moore et al. | 414/477 |
| 4,929,142 | 5/1990 | Nespor | 414/480 X |
| 4,988,258 | 1/1991 | Lutz et al. | 414/480 X |
| 5,246,329 | 9/1993 | Farrell | 414/480 X |
| 5,249,909 | 10/1993 | Roberts et al. | 414/477 X |
| 5,662,453 | 9/1997 | Gerstner et al. | 414/477 X |

FOREIGN PATENT DOCUMENTS

58-194633  11/1958  Japan .

*Primary Examiner*—David A. Bucci
*Attorney, Agent, or Firm*—Mary M. Moyne; Ian C. McLeod

[57] ABSTRACT

A wrecker truck (100) for transporting disabled vehicles is described. The truck includes an under carriage assembly (24), a subframe (10) and a deck (50). The subframe is preferably tiltably mounted on the under carriage assembly (102). The subframe includes a pair of rails (12 and 13) each having an inner rail member (34) and an outer rail member (36). The rail members are mounted parallel to each other and to the longitudinal axis A—A of the truck such that a slot (38) formed between the rail members extends parallel to the longitudinal axis of the truck. The deck is preferably slidably mounted on the subframe. The deck has a pair of T-shaped sliding members (52) mounted on the bottom side (50B) of the deck. The sliding members have a top cross bar (52A) and a vertical bottom bar (52B). Holding braces (46) having a short leg (46A) and a long leg (46B) are mounted along the length of the rail members such that the top leg extends parallel to the top wall of the rail member. The sliding members are mounted on the rail members such that the vertical bottom bar extends into the slot between the rail members and the top cross bar extends parallel to the top wall (34C, 36C) of the rail members below the holding braces.

35 Claims, 4 Drawing Sheets

WRECKER TRUCK WITH SLIDING DECK

BACKGROUND OF THE INVENTION

(1) Field of the Invention

The present invention relates to a wrecker truck having a tilting and sliding deck for ease in moving a vehicle on and off the deck for transporting the vehicle. In particular, the present invention relates to a wrecker truck having a sliding deck which uses a pair of T-shaped sliding beams which slide along a pair of rails on the subframe to allow the deck to slide along the subframe of the truck.

(2) Description of the Related Art

The related art has shown various wrecker trucks having tiltable and sliding decks for transporting vehicles. Illustrative are U.S. Pat. Nos. 2,753,064 to Lesser; 4,239,275 to Horneys et al; 2,932,418 to Ripley; 3,450,282 to Ezolt; 3,485,400 to Pewthers; 4,353,597 to Shoup; 4,645,405 to Cambiano; 4,756,658 to Moore et al and 4,929,142 to Nespor.

In particular, U.S. Pat. No. 5,246,329 to Farrell shows a flat bed truck for hauling vehicles. The truck has a multipositional flat bed to assist with loading and unloading. The flat platform for supporting the load has at least two slide rails. The slide rails are slidable on the beams of the frame. The platform also has a pivot platform which allows the bed to extend outward beyond the pivot point of the frame which forms a smaller incline on the bed.

In addition, U.S. Pat. No. 5,249,909 to Roberts et al describes a wrecker truck having dual rails mounted on the frame with I-beams mounted on the deck. The I-beams slide between the pairs of dual rails such that the rails are in contact with both the upper and lower flanges of the I-beams.

Only of minimal interest are U.S. Pat. Nos. 4,988,258 to Lutz et al; 2,576,385 to Bigsby; 2,997,343 to MacKinney et al and Japanese Patent No. 58-194633.

There remains the need for a wrecker truck having a tilting and sliding deck having T-shaped sliding members which allow for easy and controlled sliding of the deck along the rails on the subframe of the truck.

OBJECTS

It is therefore an object of the present invention to provide a wrecker truck having a tilting and sliding deck where the deck has T-shaped sliding members which slide between rails mounted on the subframe of the truck. Further, it is an object of the present invention to provide a wrecker truck which has braces on the rails to hold the T-shaped sliding members between the rails on the subframe as the deck and rails are tilted. Further still, it is an object of the present invention to provide a sliding assembly for use on a wrecker truck which is easy to construct and install and which allows for uncomplicated and smooth sliding and tilting of the deck.

These and other objects will become increasingly apparent by reference to the following drawings and the description.

DETAILED DESCRIPTION OF THE PREFERRED EMBODIMENTS

The present invention relates to a sliding assembly for use with a sliding deck truck for transporting vehicles, the truck having an under carriage assembly, a subframe assembly pivotably mounted on the under carriage assembly and a deck slidably mounted on the subframe assembly, the sliding assembly which comprises: a rail configured to be mounted between the sliding deck and the subframe assembly and extending parallel to a longitudinal axis of the truck, the rail having spaced apart first and second rail members extending parallel to the longitudinal axis of the truck; a T-shaped sliding member configured to be mounted between the sliding deck and the subframe assembly and extending parallel to the longitudinal axis of the truck and in sliding engagement with the rail wherein the T-shaped rail is configured to slide between the first and second rail members of the rail; and a holding means extending between the rail and the sliding member for holding the sliding member in sliding engagement with the rail.

Further, the present invention relates to an improved truck having a sliding deck for transporting a vehicle, the truck having an under carriage assembly defining a longitudinal axis of the truck, with a pair of axles having wheels journaled thereon and a subframe pivotably mounted on the under carriage assembly opposite the wheels, the improvement which comprises: a pair of rails mounted on the subframe and extending parallel to the longitudinal axis of the truck, each rail having parallel, spaced apart first and second rail members extending parallel to the longitudinal axis of the truck; a pair of T-shaped sliding members mounted on the sliding deck and extending parallel to the longitudinal axis of the truck wherein each of the T-shaped sliding members is configured to be slidingly engaged between the first and second rail members of the rails to allow the deck to move along the rails parallel to the longitudinal axis of the truck; and a pair of holding means, each holding means extending between each of the sliding members and the rails for holding the sliding members in sliding engagement with the first and second members of the rails.

Still further, the present invention relates to an improved truck for transporting another vehicle, the truck having an under carriage assembly with opposed ends forming the longitudinal axis of the truck and wheels mounted between the ends, the improvement which comprises: a subframe mounted on the under carriage and extending parallel to the longitudinal axis of the truck; a rail mounted on the subframe and extending parallel to the longitudinal axis of the truck, the rail having a first rail member extending parallel to and spaced apart from a second rail member; a deck movably mounted on the subframe; a T-shaped sliding member mounted on the deck and extending parallel to the longitudinal axis of the truck and configured to slide between the first and second rail members of the rail so that the deck is able to move along the rail and the subframe parallel to the longitudinal axis of the truck; and a holding means extending between the rail and the sliding member for holding the sliding member between the first and second members of the rail.

Further still, the present invention relates to a method for loading and unloading a vehicle on a truck for transport of the vehicle by the truck, the truck having an under carriage assembly, a subframe assembly pivotably mounted on the under carriage and a deck slidably mounted on the subframe assembly, which comprises: providing a sliding assembly having at least one rail configured to be mounted between the sliding deck and the subframe assembly and extending parallel to a longitudinal axis of the truck, the rail having spaced apart first and second rail members extending parallel to the longitudinal axis of the truck; at least one T-shaped sliding member configured to be mounted between the sliding deck and the subframe assembly and extending parallel to the longitudinal axis of the truck and in sliding engagement with the rail wherein the T-shaped rail is configured to slide between the first and second rail members of the rail and a holding means extending between the rail and the sliding member for holding the sliding member in sliding engagement with the rail; pivoting the subframe assembly on the under carriage assembly so that a first end of the subframe assembly is moved upward away from the under carriage assembly; moving the deck on the subframe assembly so that a first end of the deck is moved away from the first end of the subframe assembly and a second end of the deck is moved toward a ground surface wherein the T-shaped sliding member moves along the rail between the first and second rail members of the rail parallel to the longitudinal axis of the truck; and loading or unloading the vehicle on or off of the deck.

Figure 1:
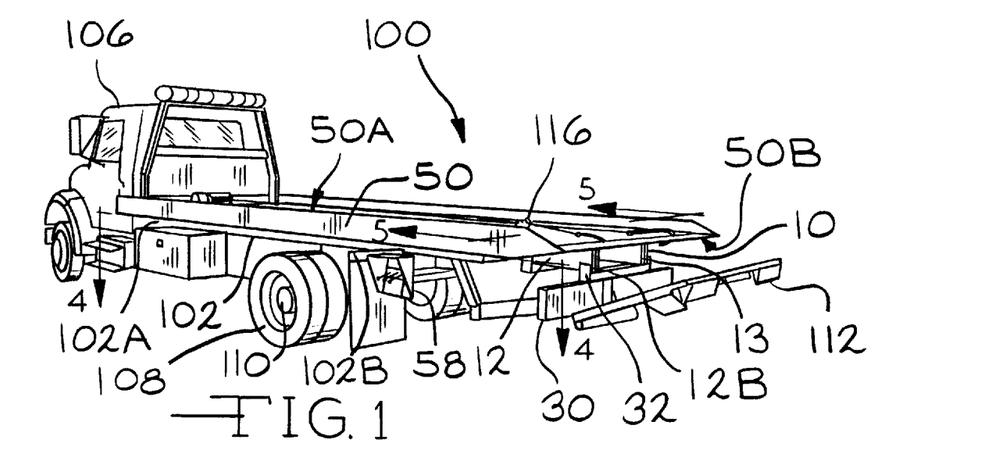
FIG. 1 is a perspective view of the wrecker truck 100 showing the sliding deck 50 in the fully retracted position.
Figure 2:
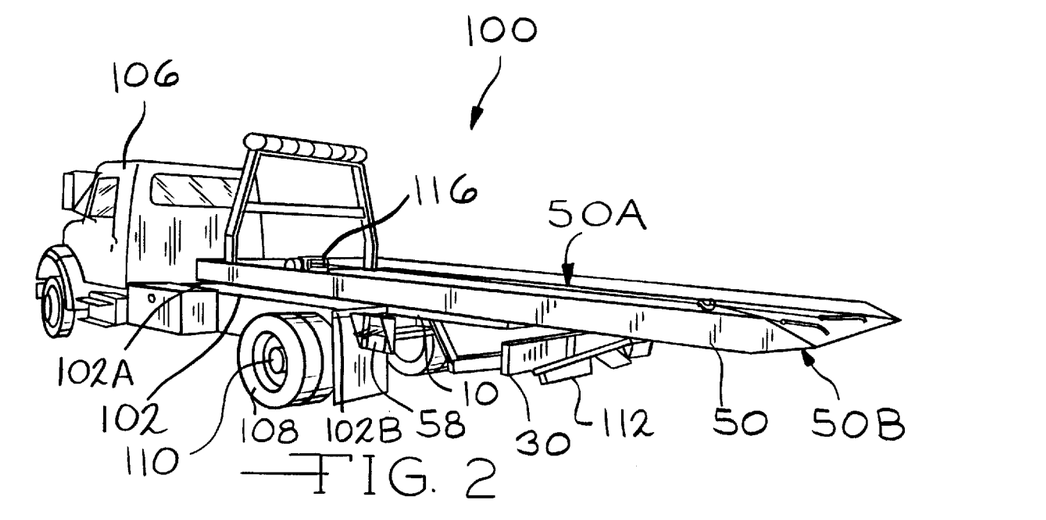
FIG. 2 is a perspective view of the wrecker truck 100 showing the sliding deck 50 in the non-tilted, extended position.
Figure 3:
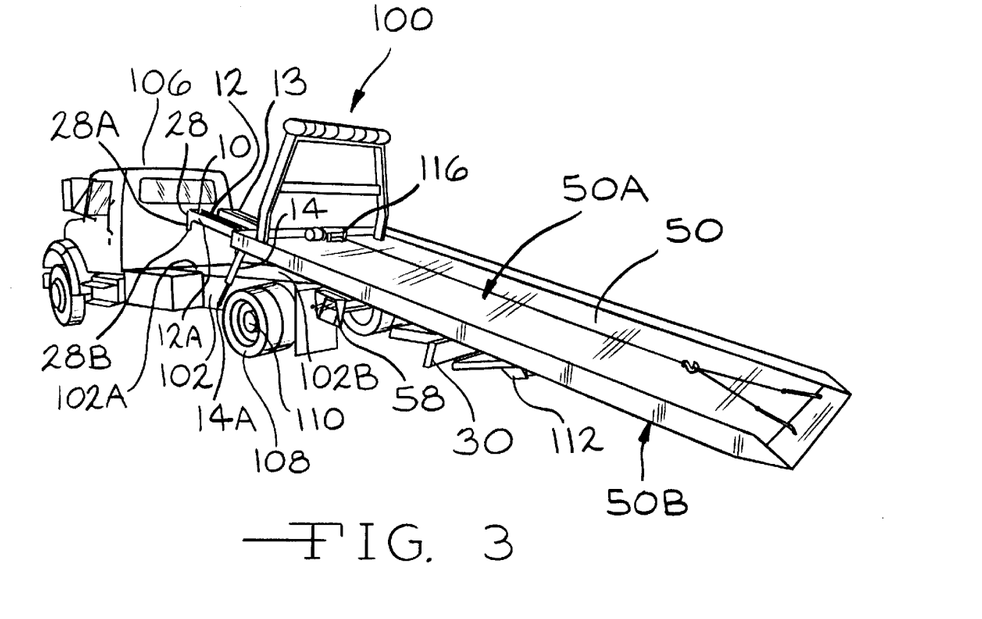
FIG. 3 is a perspective view of the wrecker truck 100 showing the sliding deck 50 in the fully tilted, fully extended position.

FIGS. 1 to 3 show the wrecker truck 100 with the sliding deck 50 of the present invention. The wrecker truck 100 preferably includes an under carriage assembly 102, a subframe 10 and a deck 50. The under carriage assembly 102 preferably has a front end 102A and a rear end 102B with a pair of beams 104 extending therebetween defining the longitudinal axis A—A of the under carriage assembly 102 and the truck 100. The under carriage assembly 102 is preferably similar to those well known in the art. The front end 102A of the under carriage assembly 102 is preferably connected to a cab 106 of the wrecker truck 100. A pair of wheels 108 are connected together by an axle 110 and are mounted on the under carriage assembly 102 between the front and rear ends 102A and 102B. The rear end 102B of the under carriage assembly 102 preferably extends only slightly past the wheels 108.

Figure 4:
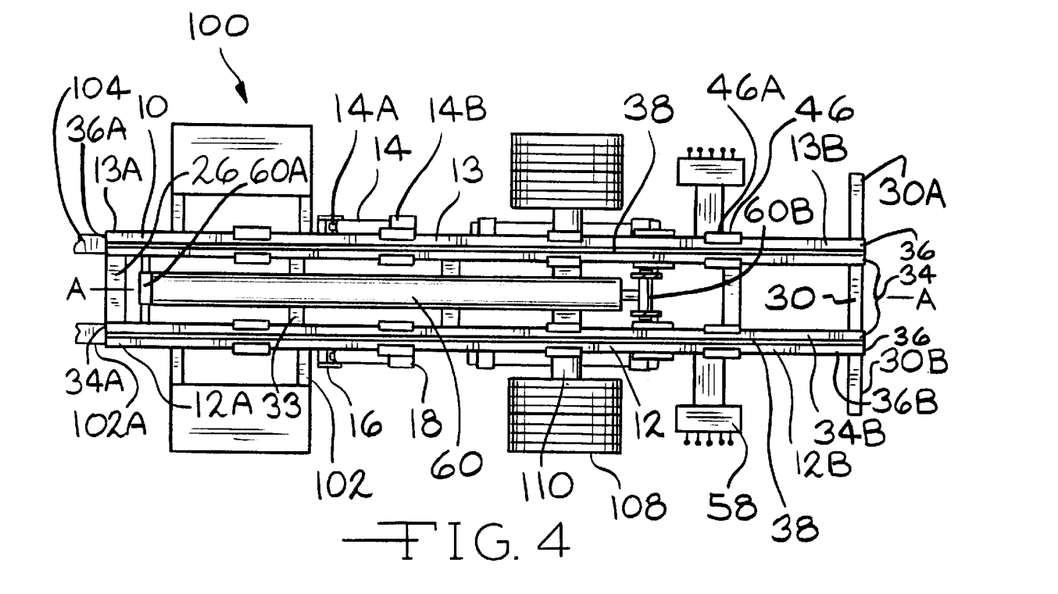
FIG. 4 is a top view of the wrecker truck 100 of FIG. 1 below the deck 50 along the line 4—4 showing the subframe 10, the rails 12 and the holding braces 46.

The subframe 10 of the wrecker truck 100 preferably includes a pair of rails 12 and 13 each having a front and a rear end 12A, 13A and 12B, 13B (FIG. 4). The rails 12 are preferably identical and therefore, only one of the rails 12 will be described in detail. The rail 12 preferably includes an inner rail member 34 and an outer rail member 36. Each having a front end 34A or 36A and a rear end 34B or 36B. The rail members 34 and 36 of the rail 12 are mounted together in a parallel, spaced apart relationship and extend parallel to the longitudinal axis A—A of the truck 100. The rail members 34 and 36 are preferably identical. Each rail member 34 and 36 preferably has an elongate, tubular rectangular shape with a top wall 34C or 36C, a bottom wall 34D or 36D, an outer wall 34E or 36E and an inner wall 34F or 36F. The rail members 34 and 36 are mounted so that the inner wall 36F of the outer rail member 36 is adjacent to and spaced apart from the inner wall 34F of the inner rail member 34. The inner walls 34F and 36F of the inner and outer rail members 34 and 36 are preferably parallel and form an elongate slot 38 extending along the length of the rails 12, parallel to the longitudinal axis A—A of the truck 100. The rail members 34 and 36 are preferably spaced apart a distance of 0.5 inches (12.5 cm) such that the slot 38 has a width of 0.28 inches (7.0 cm). The rail members 34 and 36 are preferably made of a hollow tubular member constructed of 5.0×2.0×0.125 inch walled tube (12.7×5.1×3.2 cm) steel. The ends 34A, 34B or 36A, 36B of the rail members 34 and 36 are preferably closed to prevent foreign material from entering the rail members 34 and 36.

The front ends 12A and 13A of the rails 12 and 13 are connected together by a front bar 26 having opposed ends with U-shaped brackets 28 mounted on each end of the bar 26. The rails 12 and 13 are mounted in the brackets 28 on opposite ends of the bar 26 so that the bar 26 extends completely between the rails 12 and 13 below the rails 12 and 13. The brackets 28 have an outer plate 28A and an inner plate (not shown). The outer plate 28A extends above and below the front bar 26. The lower portion 28B of the outer plate 28A which extends below the front bar 26, flares slightly outward away from the front bar 26. The flaring of the outer plate 28A slightly outward assists the front end of the subframe 10 in aligning correctly on the beams 104 of the under carriage assembly 102 as the deck 50 is lowered. The inner plate is mounted on the top of the front bar 26 slightly spaced apart from the outer plate 28A. The inner plate is mounted inward a distance equal to the width of the rail 12 or 13 and forms the U-shaped bracket 28 with the outer plate 28A. The rails 12 and 13 are mounted between the plates 28A and 28B of the bracket 28 such that the outer plate 28A is mounted on the outer wall 36E of the outer rail member 36 and the inner plate is mounted on the outer wall 34E of the inner rail member 34. The rail members 34 and 36 are mounted on the plates 28A and 28B such that the bottom wall 34D or 36D of the rail members 34 and 36 are spaced above the front bar 26. The height of the plates 28A and 28B is such as to not extend above the top wall 34C or 36C of the rail members 34 and 36. The rear ends 12B and 13B of the rails 12 and 13 are connected together similarly to the front ends 12A and 13B. The rear ends 12B and 13B of the rails 12 and 13 are connected together by a rear bar 30 with U-shaped brackets 32 at each end 30A and 30B. The U-shaped brackets 32 are mounted on the ends 30A and 30B of the rear bar 30 such that the legs (not shown) of the bracket 32 extend upward. The rear ends 12B and 13B of the rails 12 and 13 are mounted between the legs of the bracket 32 with the outer leg of the bracket 32 mounted on the outer wall 36E of the outer rail member 36 of the rail 12 or 13 and the inner leg of the bracket 32 mounted on the outer wall 34E of the inner member 34 of the rail 12 or 13. The rails 12 and 13 are mounted such that the rear ends 12B and 13B of the rails 12 and 13 are spaced above the rear bar 30. In the preferred embodiment, the rear bar 30 of the wrecker truck 100 is removably mounted on the U-shaped brackets 32 of the rear bar 30. The removability of the rear bar 30 allows the rear bar 30 to be easily replaced in case of damage without having to remove the entire subframe assembly 10. A towing or lifting assembly 112 is preferably mounted on the rear bar 30 and allows the wrecker truck 100 to be used to tow a vehicle (not shown). The towing assembly 112 is preferably able to be lifted and lowered for use by a pair of hydraulic lifts (not shown). The towing assembly 112 is preferably similar to those well known in the art. In the preferred embodiment, the rails 12 and 13 are also connected together by intermediate bars 33 spaced between the front and rear bars 26 and 30. The rail members 34 and 36 are preferably mounted on the brackets 28 and 32 by welding; however, any well known attachment means including fasteners such as bolts (not shown) could be used. In the preferred embodiment, the rail members 34 and 36 and thus, the rails 12 and 13 have a length of 192.0 inches (4876.8 cm) and a height of 5.0 inches (127.0 cm).

Figure 5:
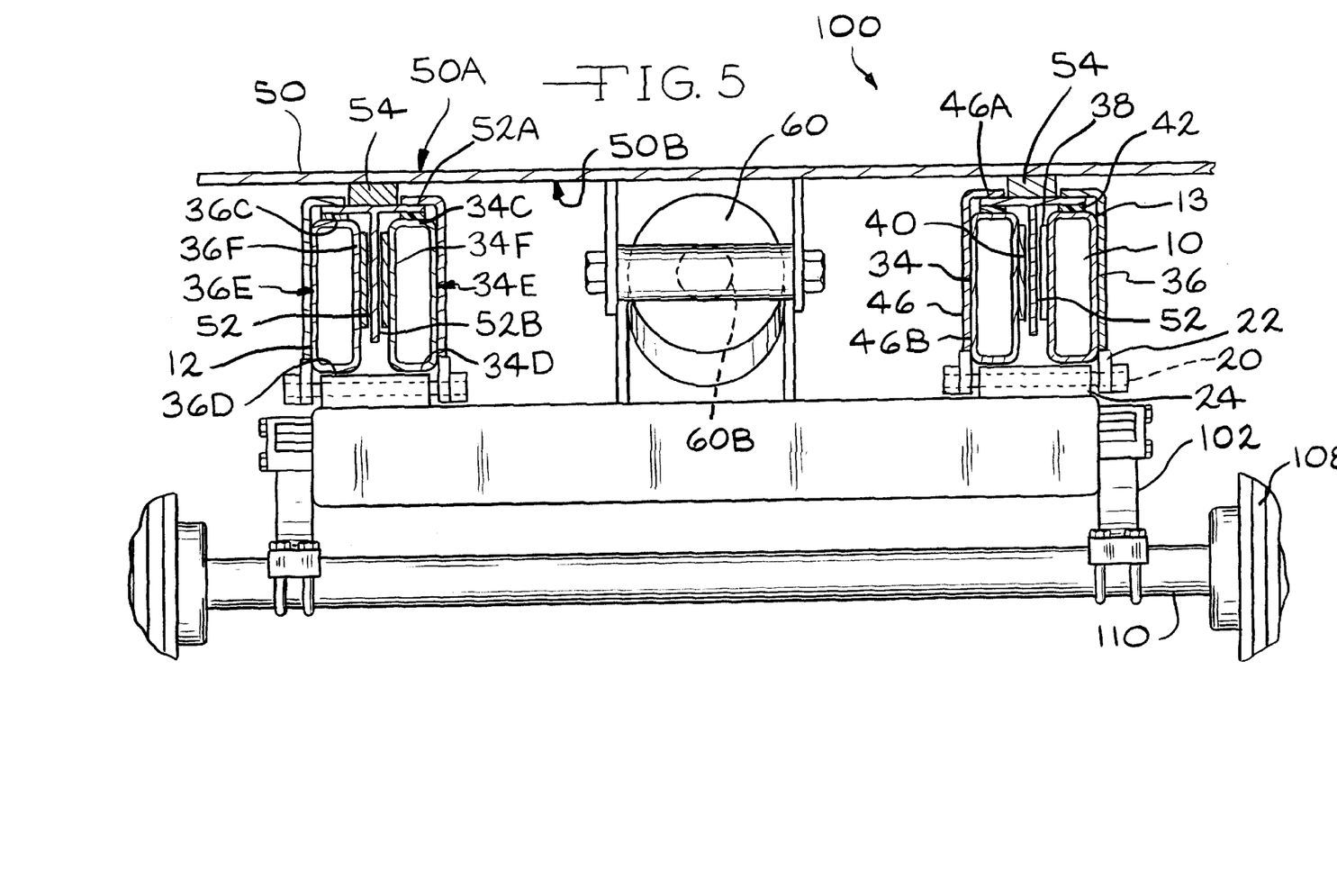
FIG. 5 is a cross-sectional view of the wrecker truck 100 of FIG. 1 along the line 5—5 showing the rails 12, the T-shaped sliding members 52 and the holding braces 46.

In the preferred embodiment, the inner walls 34F and 36F of the rail members 34 and 36 are provided with guide pads 40 (FIG. 5). Preferably, there are three (3) sets of guide pads 40 located along the length of each rail 12 or 13. One set of guide pads 40 is preferably located at each end 12A, 13A or 12B, 13B of the rails 12 or 13 and one set is preferably located in the middle. The guide pads 40 are preferably constructed of 0.25 inch (6.0 cm) steel. Alternatively, the guide pads 40 are constructed of an essentially frictionless material such as a Teflon® coated metal or plastic. A wear pad 42 is preferably removably mounted by bolts (not shown) along the top wall 34C and 36C of each of the rail members 34 and 36. The wear pads 42 are removably mounted to allow the wear pads 42 to be replaced after the pads 42 have worn out. The wear pads 42 are preferably constructed of a low friction material such as nylon. In the preferred embodiment, the wear pads 42 extend the entire length of the rail members 34 and 36 and have an initial thickness of 0.25 inches (6.0 cm).

As shown in FIG. 4, the subframe 10 of the wrecker truck 100 is tiltably mounted between the ends 102A and 102B of the under carriage assembly 102 behind the cab 106 on the side opposite the wheels 108. The subframe 10 is tiltably connected adjacent the front end 102A of the under carriage assembly 102 by a pair of hydraulic tilting pistons 14 which are connected to the rails 12 and 13 of the subframe 10. The hydraulic tilting pistons 14 are preferably positioned slightly spaced apart from the front end 12A of the rails 12 and 13. The extendable ends 14A of the tilting pistons 14 are mounted on brackets 16 secured to and extending outward from each beam 104 of the under carriage assembly 102. The other end 14B of the hydraulic tilting pistons 14 are pivotably connected to brackets 18 on the outer walls 36E of the outer rail members 36 of the rails 12 and 13 of the subframe 10. In the preferred embodiment, the hydraulic pistons 14 are similar to the hydraulic cylinders manufactured by Energy Hydraulics located in Indiana. The subframe 10 is pivotably connected to the under carriage assembly 102 adjacent the rear end 102B of the under carriage assembly 102 slightly behind the wheels 108. The subframe 10 is mounted on the under carriage assembly 102 by a pair of pins 20 which extend between a subframe bracket 22 mounted on the outer wall 36E of the outer rail member 36 and an under carriage bracket 24 mounted on the under carriage assembly 102 (FIG. 5). In the preferred embodiment, the pins 20 are fixably mounted in the subframe brackets 22 and rotatably mounted in the under carriage assembly brackets 24.

Figure 6:
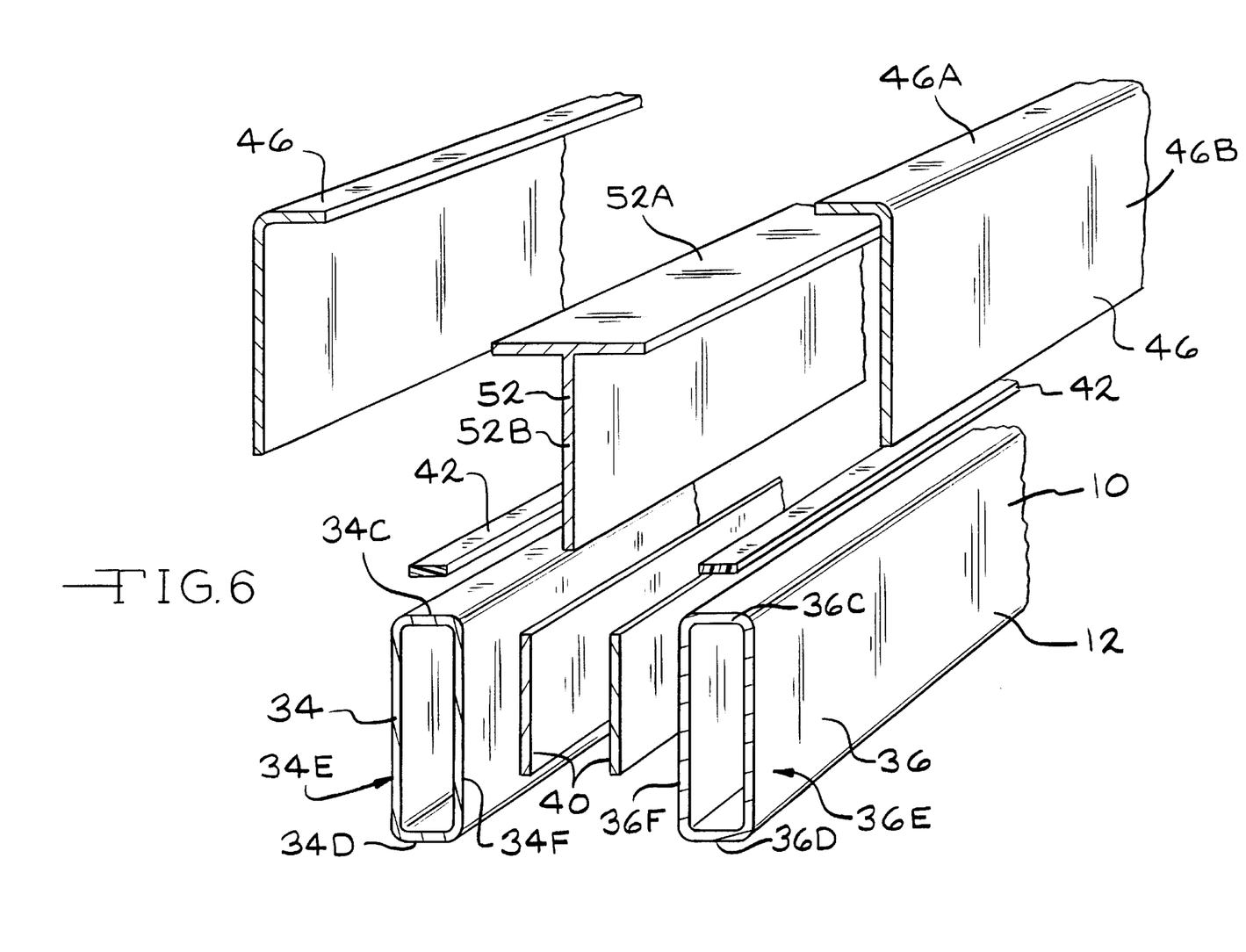
FIG. 6 is an exploded view of the T-shaped sliding member 52, the pair of rails 12, the braces 46, the wear pads 42 and the guides 40.

As shown in FIG. 4, several sets of L-shaped holding braces 46 are mounted along the length of the rails 12 and 13. Each of the L-shaped braces 46 have a short leg 46A and a long leg 46B and are preferably mounted on the rail members 34 and 36 such that the long leg 46B is parallel to the outer wall 34E or 36E of the rail member 34 or 36 and the shorter leg 46A extends inward toward the slot 38 parallel to the top wall 34C or 36C of the rail member 34 or 36. In the preferred embodiment, there are four (4) sets of braces 46 spaced along the length of the rails 12 and 13. Preferably, the short leg 46A of the brace 46 extends inward toward the slot 38 1.125 inches (28.5 cm), but does not extend to the slot 38. The short leg 46A is preferably spaced above the wear pad 42 on the top wall 34C and 36C of the rail members 34 and 36 approximately about 0.625 inches (16.0 cm) (FIG. 6). The exact amount of spacing between the wear pad 42 and the short leg 46A depends upon the thickness of the top bar 52A of the T-shaped sliding member 52 (to be described in detail hereinafter) and the thickness of the wear pad 42. The short legs 46A of the L-shaped braces 46 are preferably provided with cutouts (not shown) or alternatively, openings which allow access to the bolts (not shown) for fastening the wear pads 42 to the rail members 34 and 36 which allows the wear pads 42 to be replaced without removing the braces 46. The braces 46 are preferably spaced along the rails 12 such as to not interfere with the bars 26, 30 and 33 which connect the rails 12 together. The braces 46 are preferably constructed of steel and are fastened to the rail members 34 and 36 by welding.

The sliding deck 50 of the wrecker truck 100 preferably has a top side 50A and a bottom side 50B with a pair of T-shaped sliding members 52 mounted on the bottom side 50B (FIG. 5). The deck 50 is preferably similar to those well known in the art for use with wrecker trucks for transporting vehicles. The T-shaped sliding members 52 have a top cross bar 52A and a bottom vertical bar 52B. The sliding members 52 are preferably mounted on the bottom side 50B of the deck 50 so that the top cross bar 52A extends parallel and adjacent to the bottom side 50B of the deck 50 with the bottom bar 52B extending downward perpendicular to the top cross bar 52A. The sliding members 52 preferably extend the entire length of the deck 50. In the preferred embodiment, when the deck 50 is mounted on the subframe 10 of the wrecker truck 100, the T-shaped sliding members 52 extend parallel to the longitudinal axis A—A of the truck 100. A spacer 54 is preferably provided between the top cross bar 52A and the deck 50 and acts to mount the sliding member 52 to the deck 50 and to space the top cross bar 52A away from the deck 50 (FIG. 5). The spacer 54 preferably has a thickness of 0.625 inches (16.0 cm) and is constructed of steel. The thickness of the spacer 54 is preferably slightly greater than the thickness of the short leg 46A of the holding braces 46 on the rails 12 and 13. The top cross bar 52A of the T-shaped sliding member 52 preferably has a thickness of 0.24 inches (6.0 cm) and a width of 4.0 inches (101.0 cm). The bottom vertical bar 52B preferably has a thickness of 0.28 inches (7.0 cm) and extends downward a distance of 5.0 inches (127.0 cm). The T-shaped sliding member 52 is preferably constructed as a unitary piece and is constructed of steel. The bottom side 50B of the deck 50 can be provided with grooves (not shown) extending the length of the deck 50 with the T-shaped sliding members 52 and the spacers 54 mounted in the grooves. The grooves enable the distance between the bottom side 50B of the deck 50 and the subframe assembly 10 to be less. Alternatively, the deck 50 is not provided with grooves and the spacers 54 have a greater thickness to enable the short legs 46A of the braces 46 mounted on the rails 12 and 13 to easily slide between the top cross bar 52A of the T-shaped member 52 and the bottom side 50B of the deck 50. In the preferred embodiment, the bottom vertical bar 52B of the T-shaped sliding member 52, adjacent the rear end of the deck 50 is angled to provide space under the deck 50 for the towing assembly 112. In addition, the angled shape of the bottom bar 52B allows the deck 50 to make contact with the ground surface (not shown) without interference from the T-shaped sliding members 52.

A hydraulic sliding piston 60 is mounted between the front ends 12A and 13A of the rails 12 and 13 and the bottom side 50B of the deck 50 (FIG. 4). The first, non-extending end 60A of the piston 60 is mounted on the front bar 26 connecting the front ends 12A of the rails 12 together. The second, extendable end 60B of the piston 60 is preferably mounted on the bottom side 50B of the deck 50 between the T-shaped sliding members 52. The sliding piston 60 is preferably similar to those well known in the art such as the hydraulic cylinder manufactured by Energy Hydraulics located in Indiana.

A hydraulic control panel 58 for controlling the sliding and tilting of the deck 50 is preferably mounted on the rear end of the subframe 10 in front of the rear bar 30 (FIG. 4). In the preferred embodiment, the hydraulic system (not shown) for activating the sliding piston 60 and the tilting pistons 14 as well as the lifts (not shown) for the towing assembly 112 are provided by the engine (not shown) of the wrecker truck 100.

IN USE

In the preferred embodiment, the wrecker truck 100 with the sliding deck 50 is used to transport a vehicle (not shown), preferably a disabled vehicle, on the deck 50 of the truck 100 without damage to the vehicle. In addition, the towing assembly 112 on the rear bar 30 allows a second disabled vehicle (not shown) to be transported by towing.

To use the wrecker truck 100, the sliding deck 50 is mounted on the subframe 10 of the truck 100. To mount the sliding deck 50 on the subframe 10, the front end of the sliding members 52 are inserted into the slot 38 between the rail members 34 and 36 at the rear ends 12B and 13B of the rails 12 and 13 and the sliding piston 60 is connected between the deck 50 and the subframe 10. The sliding members 52 are inserted into the slot 38 such that the vertical bottom bar 52B is spaced in the slot 38 between the inner walls 34F and 36F of the rail members 34 and 36 adjacent the guide pads 40 (FIG. 5). The guide pads 40 preferably assist in aligning the sliding members 52 in the slots 38. The guide pads 40 also prevent extraneous side to side movement of the vertical bottom bar 52B of the sliding member 52 in the slot 38. The top cross bar 52A of the sliding member 52 preferably extends parallel to the top wall 34C of the rail member 34 and is spaced between the wear pads 42 and the braces 46 (FIG. 5). The top cross bar 52A is preferably in contact with the wear pads 42 but is not in contact with the braces 46. The spacer 54 preferably spaces the sliding members 52 away from the bottom side 50B of the deck 50 such that the braces 46 can extend over the top vertical member 52A of the sliding members 52 and not make contact with the bottom side 50B of the deck 50. The length of the short leg 46A of the braces 46 allows the braces 46 to extend over the top cross bar 52A of the sliding member 52 to hold the sliding members 52 between the rail members 34 and 36 and also to allow an opening between the legs 46A and 46B of the two adjacent braces 46 which allows the spacer 54 to mount the sliding member 52 to the deck 50. In the preferred embodiment, the weight of the deck 50 is on the top cross bar 52A of the sliding member 52 which is in contact with the wear pads 42 which are mounted on the top wall 34C and 36C of the rail members 34 and 36. Thus, the weight of the deck 50 is preferably on the top wall 34C and 36C of the rail members 34 and 36.

Once the wrecker truck 100 is assembled, the rear end of the truck 100 is positioned adjacent to and slightly in front of the disabled vehicle. Next, the sliding piston 60 is activated to move the sliding deck 50 backward, off the subframe 10 toward the disabled vehicle (FIG. 2). As the sliding deck 50 moves along the subframe assembly 10, the sliding members 52 move in the slot 38 between the rail members 34 and 36. Preferably, as the deck 50 is sliding, the sliding members 52 only come in contact with the wear pads 42. However, it is possible that as the deck 50 moves, the sliding members 52 will also come in contact with the braces 46 and the guide pads 40. Preferably, any such contact is brief and does not occur during the entire duration of the sliding. The wrecker truck 100 is spaced apart from the disabled vehicle a distance such that when the deck 50 is extended, the rear end of the deck 50 is in front of the disabled vehicle and does not make contact with the vehicle when fully extended. The deck 50 preferably moves a total of 110.0 inches (2794.0 cm) from the fully retracted position to the fully extended position. If necessary, the sliding deck 50 can be moved less than the full distance. However, the shorter the distance the deck 50 is extended, the greater the angle of incline of the deck 50 with regard to the ground surface after the deck 50 is tilted (FIG. 3). Once the deck 50 is in the fully extended or desired, partially extended position, the tilting pistons 14 are then activated to tilt the subframe 10 with the deck 50. The subframe 10 tilts at the pivot pins 20 at the rear end 102B of the under carriage assembly 102 as the front end of the subframe 10 is moved upward and the rear end of the deck 50 moves downward toward the ground surface. Once the subframe 10 begins to tilt, the braces 46 prevent the sliding members 52 and the deck 50 from lifting out from between the rails 12. The sliding piston 60 prevents the deck 50 from moving rearward as the subframe assembly 10 is tilted upward. In the preferred embodiment, when the rear end of the deck 50 touches the ground surface, the hydraulic tilting pistons 14 (FIG. 3) stop moving the front end of the subframe 10 upward. Preferably, when the rear end of the deck 50 touches the ground surface, the sliding pistons 60 are in the fully extended or almost fully extended position. In the preferred embodiment, when the deck 50 is fully extended backwards, the angle between the rear end of the deck 50 and the ground surface is approximately about 11°. However, preferably the angle between the rear end of the deck 50 and the ground surface can range between 9° and 11°, depending upon the distance the sliding deck 50 has been extended.

Once the deck 50 is extended and tilted and in contact with the ground surface, the disabled vehicle is moved onto the top side 50A of the deck 50. Preferably, a winch system 116 is provided on the top side 50A of the deck 50 for pulling the vehicle onto the deck 50 (FIG. 3). Once the vehicle is fully on the deck 50, the tilting pistons 14 are activated to lower the front end of the subframe assembly 10 and the deck 50. Once the deck 50 and subframe 10 are fully lowered, the sliding piston 60 is activated to move the deck 50 toward the cab 106 of the truck 100 until the deck 50 is fully retracted onto the subframe 10. Next, the disabled vehicle is secured to the deck 50 preferably by using tire tie downs (not shown). Once the vehicle is secured on the deck 50, the vehicle is ready to be transported by the wrecker truck 100. If necessary, the towing assembly 112 on the rear bar 30 of the truck 100 can be lowered and connected to a second disabled vehicle (not shown) for towing two disabled vehicles. To remove the disabled vehicle from the wrecker truck 100, the above procedure is reversed.

It is intended that the foregoing description be only illustrative of the present invention and that the present invention be limited only by the hereinafter appended claims.

I claim:

1. A sliding assembly for use with a sliding deck truck for transporting vehicles, the truck having an under carriage assembly, a subframe assembly pivotably mounted on the under carriage assembly and a deck slidably mounted on the subframe assembly, the sliding assembly which comprises:

(a) a rail configured to be mounted between the sliding deck and the subframe assembly and extending parallel to a longitudinal axis of the truck, the rail having spaced apart first and second rail members extending parallel to the longitudinal axis of the truck;

(b) a T-shaped sliding member configured to be mounted between the sliding deck and the subframe assembly and extending parallel to the longitudinal axis of the truck and in sliding engagement with the rail wherein the T-shaped rail is configured to slide between the first and second rail members of the rail; and (c) a holding means extending between the rail and the sliding member for holding the sliding member in sliding engagement with the rail.

2. The sliding assembly of claim 1 wherein the T-shaped sliding member is mounted on a bottom surface of the deck.

3. The sliding assembly of claim 2 wherein the rail is mounted on the subframe assembly on a side opposite the under carriage assembly.

4. The sliding assembly of claim 3 wherein the sliding member is mounted on the bottom surface of the deck such that a top horizontal bar of the T-shaped sliding member extends parallel and spaced apart from the bottom surface of the deck and a bottom, vertical bar of the T-shaped sliding member extends outward perpendicular to the top, horizontal bar in a direction opposite the bottom surface of the deck.

5. The sliding assembly of claim 4 wherein the first and second rail members have a rectangular, tubular shape with a top wall, a bottom wall, an inner sidewall and an outer sidewall and are mounted so that the inner sidewall of the first rail member is adjacent the inner sidewall of the second rail member.

6. The sliding assembly of claim 1 wherein there are a pair of T-shaped sliding members and a pair of rails.

7. The sliding assembly of claim 5 wherein the holding means is mounted on the rail.

8. The sliding assembly of claim 7 wherein there are a plurality of holding means mounted on the rail.

9. The sliding assembly of claim 7 wherein the holding means is a pair of L-shaped brackets.

10. The sliding assembly of claim 9 wherein the L-shaped brackets are mounted on each of the first and second rail members.

11. The sliding assembly of claim 10 wherein the L-shaped brackets have a first vertical leg and a horizontal second leg and wherein the brackets are mounted on the rail members so that the first vertical leg extends parallel to and is mounted to the sidewalls of the first and second rail members and the horizontal second leg extends parallel to and spaced apart from a top wall of the first and second rail members.

12. The sliding assembly of claim 11 wherein the horizontal second leg is spaced apart from the top wall of the first and second rail members a distance greater than a thickness of the top horizontal bar of the sliding member.

13. The sliding assembly of claim 12 wherein a wear pad is mounted on the top wall of each of the first and second rail members.

14. The sliding assembly of claim 13 wherein a pair of guides are mounted on the adjacent inner sidewalls of the first and second rail members.

15. The sliding assembly of claim 14 wherein a distance between the guides is at least as great as a thickness of the vertical bar of the T-shaped sliding member.

16. The sliding assembly of claim 12 wherein the sliding member is mounted on the bottom surface of the deck by a spacer.

17. The sliding assembly of claim 16 wherein the spacer has a thickness greater than a thickness of the horizontal second legs of the brackets.

18. The sliding assembly of claim 13 wherein the horizontal second legs of the brackets are spaced above the top wall of the first and second rail members a distance at least equal to a thickness of a wear pad plus a thickness of the top horizontal bar of the sliding member and wherein the bracket prevents the T-shaped sliding member from moving upward from between the first and second rail members.

19. The sliding assembly of claim 13 wherein the wear pads are constructed of nylon.

20. The sliding assembly of claim 14 wherein the guides are constructed of steel.

21. In an improved truck having a sliding deck for transporting a vehicle, the truck having an under carriage assembly defining a longitudinal axis of the truck, with a pair of axles having wheels journaled thereon and a subframe pivotably mounted on the under carriage assembly opposite the wheels, the improvement which comprises:

(a) a pair of rails mounted on the subframe and extending parallel to the longitudinal axis of the truck, each rail having parallel, spaced apart first and second rail members extending parallel to the longitudinal axis of the truck;

(b) a pair of T-shaped sliding members mounted on the sliding deck and extending parallel to the longitudinal axis of the truck wherein each of the T-shaped sliding members is configured to be slidingly engaged between the first and second rail members of the rails to allow the deck to move along the rails parallel to the longitudinal axis of the truck; and (c) a pair of holding means, each holding means extending between each of the sliding members and the rails for holding the sliding members in sliding engagement with the first and second members of the rails.

22. An improved truck of claim 21 wherein the sliding member is mounted on a bottom surface of the deck such that a top horizontal bar of the T-shaped sliding member extends parallel and spaced apart from the bottom surface of the deck and a bottom, vertical bar of the T-shaped sliding member extends outward perpendicular to the top, horizontal bar in a direction opposite the bottom surface of the deck.

23. An improved truck of claim 22 wherein the first and second rail members having a rectangular, tubular shape with a top wall, a bottom wall, an inner sidewall and an outer sidewall and are mounted so that the inner sidewall of the first rail member is adjacent the inner sidewall of the second rail member.

24. An improved truck of claim 21 wherein the holding means is mounted on the rail.

25. An improved truck of claim 23 wherein each of the holding means includes a plurality of L-shaped brackets mounted on the rail.

26. An improved truck of claim 25 wherein the L-shaped brackets have a first vertical leg and a second horizontal leg and wherein the brackets are mounted on the first and second members so that the first leg is mounted on and extends parallel to the sidewalls of the rail members and the second leg extends parallel to and spaced apart from a top wall of the rail members.

27. An improved truck of claim 26 wherein the second leg is spaced apart from the top wall of the rail members a distance greater than a thickness of the top horizontal bar of the sliding member.

28. An improved truck of claim 27 wherein a wear pad is mounted on the top wall of each of the rail members.

29. An improved truck of claim 23 wherein a pair of guides are mounted on the adjacent inner sidewalls of the rail members.

30. An improved truck of claim 29 wherein the distance between the guides is at least as great as a thickness of the bottom vertical bar of the T-shaped sliding member.

31. An improved truck of claim 26 wherein the sliding member is mounted on the bottom surface of the deck by a spacer.

32. An improved truck of claim 31 wherein the spacer has a thickness greater than a thickness of the second leg of the bracket.

33. An improved truck of claim 28 wherein the second leg of the bracket is spaced above the top of the rail members a distance at least equal to a thickness of the wear pad mounted on the top wall of the rail members and a thickness of the top horizontal bar of the sliding member wherein the bracket prevents the T-shaped sliding member from lifting from between the rail members.

34. In an improved truck for transporting another vehicle, the truck having an under carriage assembly with opposed ends forming the longitudinal axis of the truck and wheels mounted between the ends, the improvement which comprises:

(a) a subframe mounted on the under carriage and extending parallel to the longitudinal axis of the truck;

(b) a rail mounted on the subframe and extending parallel to the longitudinal axis of the truck, the rail having a first rail member extending parallel to and spaced apart from a second rail member;

(c) a deck movably mounted on the subframe;

(d) a T-shaped sliding member mounted on the deck and extending parallel to the longitudinal axis of the truck and configured to slide between the first and second rail members of the rail so that the deck is able to move along the rail and the subframe parallel to the longitudinal axis of the truck; and (e) a holding means extending between the rail and the sliding member for holding the sliding member between the first and second members of the rail.

35. A method for loading and unloading a vehicle on a truck for transport of the vehicle by the truck, the truck having an under carriage assembly, a subframe assembly pivotably mounted on the under carriage and a deck slidably mounted on the subframe assembly, which comprises:

(a) providing a sliding assembly having at least one rail configured to be mounted between the sliding deck and the subframe assembly and extending parallel to a longitudinal axis of the truck, the rail having spaced apart first and second rail members extending parallel to the longitudinal axis of the truck; at least one T-shaped sliding member configured to be mounted between the sliding deck and the subframe assembly and extending parallel to the longitudinal axis of the truck and in sliding engagement with the rail wherein the T-shaped rail is configured to slide between the first and second rail members of the rail and a holding means extending between the rail and the sliding member for holding the sliding member in sliding engagement with the rail;

(b) pivoting the subframe assembly on the under carriage assembly so that a first end of the subframe assembly is moved upward away from the under carriage assembly;

(c) moving the deck on the subframe assembly so that a first end of the deck is moved away from the first end of the subframe assembly and a second end of the deck is moved toward a ground surface wherein the T-shaped sliding member moves along the rail between the first and second rail members of the rail parallel to the longitudinal axis of the truck; and (d) loading or unloading the vehicle on or off of the deck.

* * * * *